United States Patent [19]

Vigoureux

[11] 4,084,581
[45] Apr. 18, 1978

[54] APPARATUS FOR FOCUSING AND USING SOLAR ENERGY

[76] Inventor: Francis E. Vigoureux, Residence la Grande Candelle-Allee des Pins, Marseille, France, 13009

[21] Appl. No.: 727,842

[22] Filed: Sep. 29, 1976

[51] Int. Cl.² .............................................. F24J 3/02
[52] U.S. Cl. .................................... 126/271; 126/270
[58] Field of Search ............... 126/270, 271; 237/1 A; 350/299, 292, 294; 240/41.6, 41.1, 41.35 C, 41.35 F, 41.36

[56] References Cited

U.S. PATENT DOCUMENTS

| 787,145 | 4/1905 | Brown | 126/271 |
|---|---|---|---|
| 1,421,506 | 7/1922 | Limpert | 126/271 X |
| 2,791,214 | 5/1957 | Poliansky | 126/270 |
| 3,295,512 | 1/1967 | McCusker | 126/270 |
| 3,558,219 | 1/1971 | Buckingham et al. | 350/299 |
| 3,964,464 | 6/1976 | Hockman | 126/271 |
| 3,984,985 | 10/1976 | Lapeyre | 60/641 |

*Primary Examiner*—Kenneth W. Sprague
*Assistant Examiner*—Larry Jones
*Attorney, Agent, or Firm*—Marvin Feldman; Stephen E. Feldman

[57] ABSTRACT

For focusing and using solar energy, an apparatus comprises outer reflectors and inner back-reflectors distributed symmetrically with respect to an axis, which axis is maintained towards the sun during daylight hours. A heat collector is positioned along this axis beyond the reflectors and back-reflectors. In section by any plane passing through the axis, the reflectors form a continuous broken line and the back-reflectors a discontinuous broken line. The heat received in the collector can be used for heating water.

8 Claims, 9 Drawing Figures

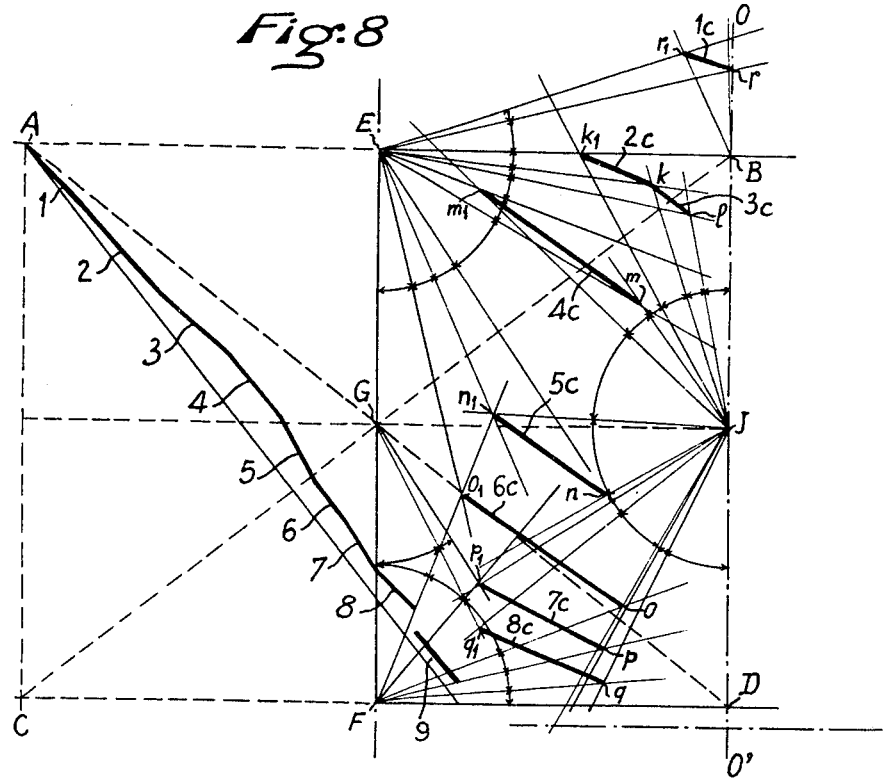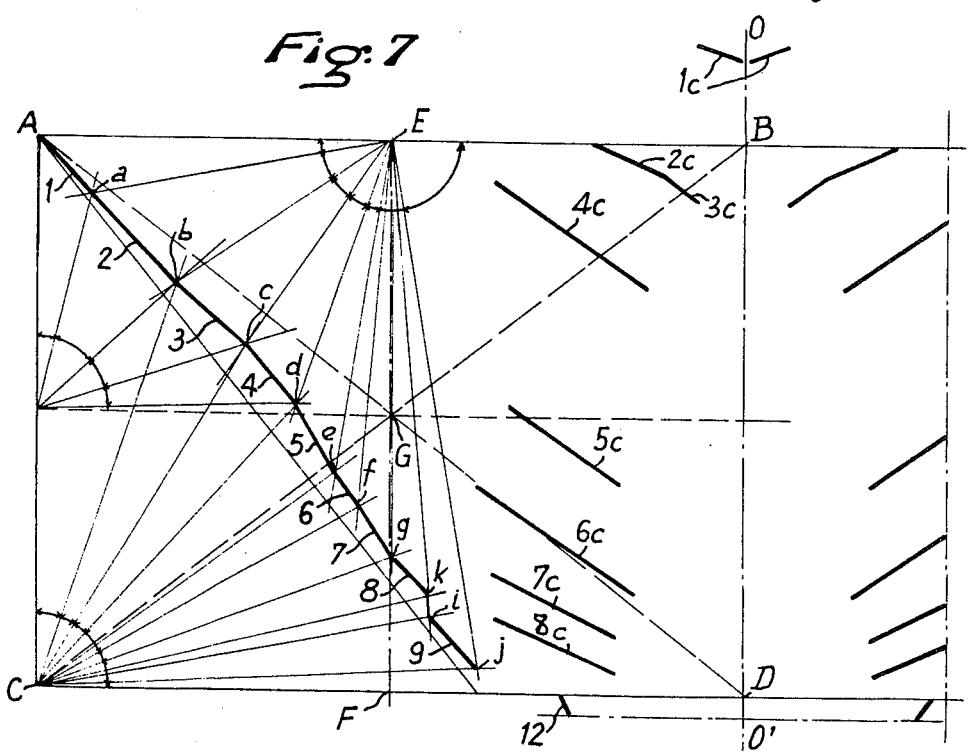

APPARATUS FOR FOCUSING AND USING SOLAR ENERGY

FIELD OF THE INVENTION

The invention relates to apparatuses for focusing by reflection and using solar energy, of the type which comprise outer reflectors and inner back-reflectors arranged according to an invariable geometry and symmetrically distributed with respect to an axis; means adapted to keep this axis directed towards the sun during daylight hours; and heat collecting means located along said axis in a position such that they receive the solar rays reflected by the reflectors and back-reflectors.

By "reflectors" is meant reflecting surfaces oriented so as to receive directly incident solar rays and by "back-reflectors" reflecting surfaces oriented so as to receive the solar rays already reflected by the reflectors and send them back after a further reflection.

BACKGROUND OF THE INVENTION

Apparatuses of the type outlined in the foregoing are already known. Thus U.S. Pat. No. 3,295,512 (Thomas J. McCusker) describes an apparatus which comprises a single conical reflector inside which a column of parabolic back-reflectors is arranged. The assembly of this apparatus is such that each incident solar ray is reflected first inwards by the conical reflector, then outwards by one of the parabolic back-reflectors and again inwards by the conical reflector, which focuses the solar rays, which have thus undergone triple reflection, on to heat collecting means whose centre coincides with that of the base (or input surface) of the conical reflector.

One of the drawbacks of this known apparatus is that its parabolic back-reflectors are difficult to construct with a satisfactory geometrical shape.

Another drawback is that the heat-collecting means are situated at a position which is difficult to reach, and constitute an impassible obstacle for the incident solar rays. The space available is therefore insufficient to house, inside the conical reflector, the heat-collecting means and their connections with the outside of the apparatus, if it is desired to limit to a reasonable value the central fraction of the conical reflector which is rendered unusable by the presence of these collecting means.

A third drawback resides in the fact that the solar rays all undergo triple reflection which considerably reduces the energy efficiency of the apparatus.

SUMMARY OF THE INVENTION

It is an object of the invention to provide an apparatus of the type concerned which eliminates the above-mentioned drawbacks or at least reduces them.

To this end, the apparatus for focusing by reflection and using solar energy is characterised, according to the invention, essentially in that all its reflectors and back-reflectors have a rectilinear aspect in section through any plane passing through its axis and are arranged so that the heat-collecting means are positioned beyond their assembly, in the input direction of the incident solar rays, and in that the reflectors are grouped so as to form a practically continuous surface whose general appearance is that of a truncated cone or pyramid but whose section through said plane is a broken line whilst the back-reflectors are staggered axially and radially so that the solar rays reflected directly by the reflectors and reflected a second time by the back-reflectors can reach the collecting means without being intercepted by another reflector or back-reflector.

The reflectors and back-reflectors can each have a frustoconic shape or polyhedral truncated pyramid shape. If their shape is frustoconic, the axis of the apparatus constitutes their axis of revolution and they can easily each be formed by bending over a jig, from a flat sheet of metal or of reflecting plastics material. If their shape is polyhedral, they can be constituted by the juxtaposition of flat facets. In this case, if each of the reflectors and back-reflectors comprises an even number of facets, the axis of the apparatus constitutes an axis of symmetry for the reflectors and back-reflectors; if it comprises an odd number $n$ of facets, the latter are derived from one another by rotation, around said axis, through an angle equal to $360°/n$ or to a multiple of this angle.

In a preferred embodiment, at least one back-reflector situated in the vicinity of the input plane of the assembly of reflectors acts not only on one of its surfaces as a back-reflector for the solar rays already reflected directly by reflectors, but also by its other surface as a reflector to reflect directly the solar rays close to the axis of the apparatus, to another back-reflector closer still to the axis.

Considering that the reflectors and back-reflectors of the apparatus according to the invention are formed of furstoconic surfaces or of flat facets, it is possible to manufacture them easily by means of flat sheets of metal or of reflecting plastics material which it suffices to bend in the case of frustoconic surfaces or to assemble side by side, notably by welding or glueing, in the case of polyhedral surfaces. Since the collecting means are placed beyond the assembly of reflectors and back reflectors, it is possible to give them the desired volume without risking intercepting useful solar rays and, consequently, reducing the efficiency of the apparatus. Considering lastly that the solar rays only undergo two reflections before reaching the collecting means, the energy losses by reflection are relatively low, which contributes also to increasing the overall efficiency of the apparatus.

Preferably, the truncated conical or pyramidal surface along which the reflectors are grouped has a half angle at the apex of the order of 40° and the section of each reflector through a plane passing through the axis of the apparatus forms with this axis an angle comprised between 35° and 50°.

By graphical methods or by calculation, in particular by means of a computer, it is easy, with the aid of the rules given above, to determine the angles, the dimensions and the mutual positioning of the reflectors and back-reflectors. However, it has been proved by experimental methods that the particular embodiment which is illustrated in the accompanying drawings gives particularly advantageous results.

BRIEF DESCRIPTION OF THE DRAWINGS

FIGS. 6 to 8 show, by sections similar to that of FIG. 5, how the various reflectors and back-reflectors are located and dimensioned.

PREFERRED EMBODIMENTS OF THE INVENTION

In the preferred embodiment which is shown in the accompanying drawings, the apparatus comprises nine reflectors denoted respectively by 1,2. . 8 and 9 and eight back-reflectors denoted respectively by 1c, 2c . . . 7c and 8c; these reflectors and back-reflectors are distributed symmetrically around an axis O—O', in an invariable geometry.

Figure 1:
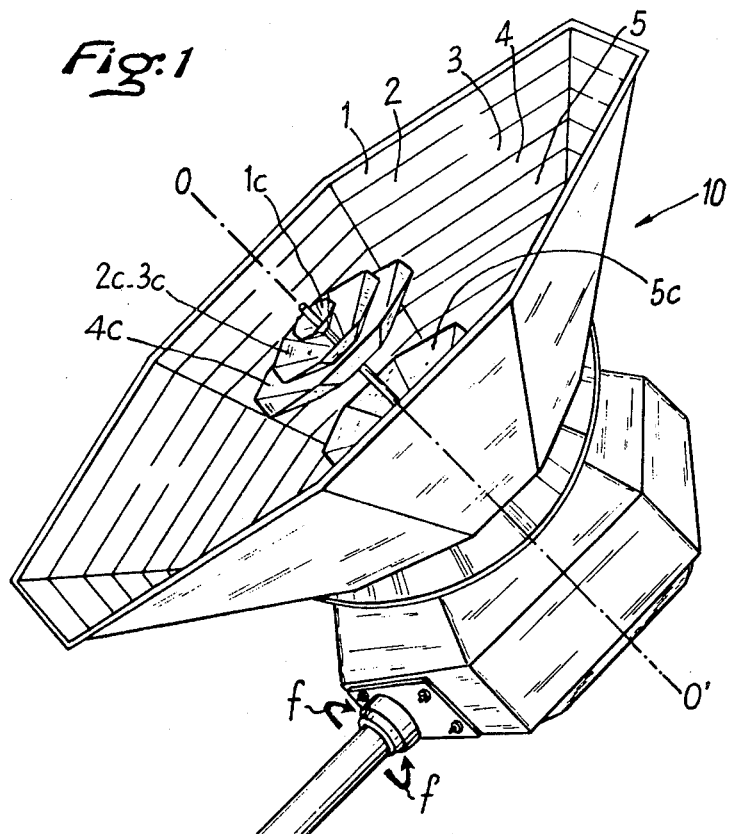
FIG. 1 of these drawings, shows in perspective an apparatus according to the invention with polyhedral reflectors and back-reflectors.

The apparatus comprises in addition means adapted to maintain automatically, during daylight hours, the axis O—O' directed towards the sun. Such means are well known, for example, for orienting astronomical telescopes and will hence not be described here in detail. As is shown in FIG. 1, these means can rotate the movable mechanism 10 comprising reflectors and back-reflectors, as indicated by the arrows $f$, around a shaft 11 and adjust also the inclination of this shaft as indicated by the arrows F. The angle of inclination of the shaft 11 is determined according to the latitude of the site where the apparatus is located and the height of the sun according to the periodic cycles whilst the apparent diurnal motion of the sun is followed by the rotation of the mechanism around the shaft 11.

The apparatus also comprises heat-collecting means situated along the axis O—O' at a position such that they receive the solar rays reflected by the reflectors 1 to 9 and back-reflectors 1c to 8c. These heat collecting means can be constituted by a collector 12 (FIG. 5) closed and heat insulated, forming a black box. The collected energy can be used directly as radiant energy or converted into another form of energy, for example electric or thermal, which will be used for domestic or industrial purposes.

Figure 2:
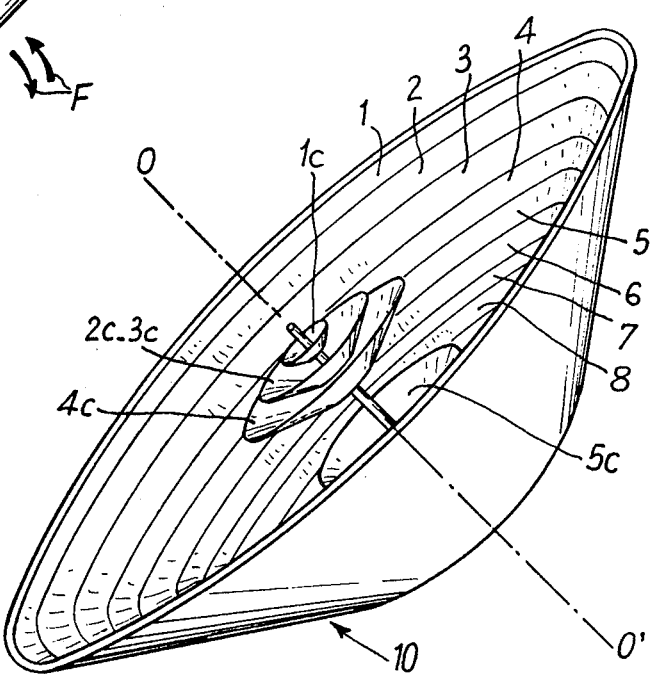
FIG. 2 shows in perspective, a modification of a portion of the apparatus of FIG. 1, with frustoconic reflectors and back-reflectors.
Figure 9:
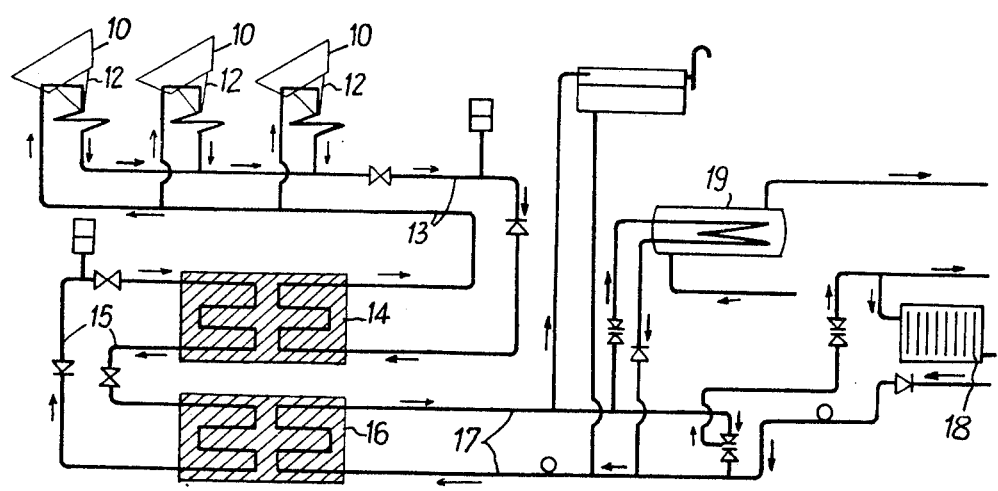
FIG. 9, lastly, shows the diagram of a heating installation comprising several apparatuses similar to that of FIGS. 1 to 8.

By way of indication, there is shown in FIG. 9 a central heating installation which comprises in series three apparatuses with a movable mechanism 10 and collector 12 each of which is identical with that of FIG. 1 or with that of FIG. 1 as modified by FIG. 2. A primary heat-transmitting fluid circuit 13 passes through the collectors 12 where it takes up the captured solar heat and transmits it to a heat accumulator 14. A secondary fluid circuit 15 can be established between the accumulator 14 and a secondary accumulator 16. Lastly, a hot water central heating circuit 17, of which only a radiator 18 is shown, takes up the heat in accumulator 16 to transmit it to radiators such as 18. The circuit 17 can also serve for heating water in a container 19 for distribution in residential premises for the usual purposes (kitchen, bathroom, etc.).

Figure 4:
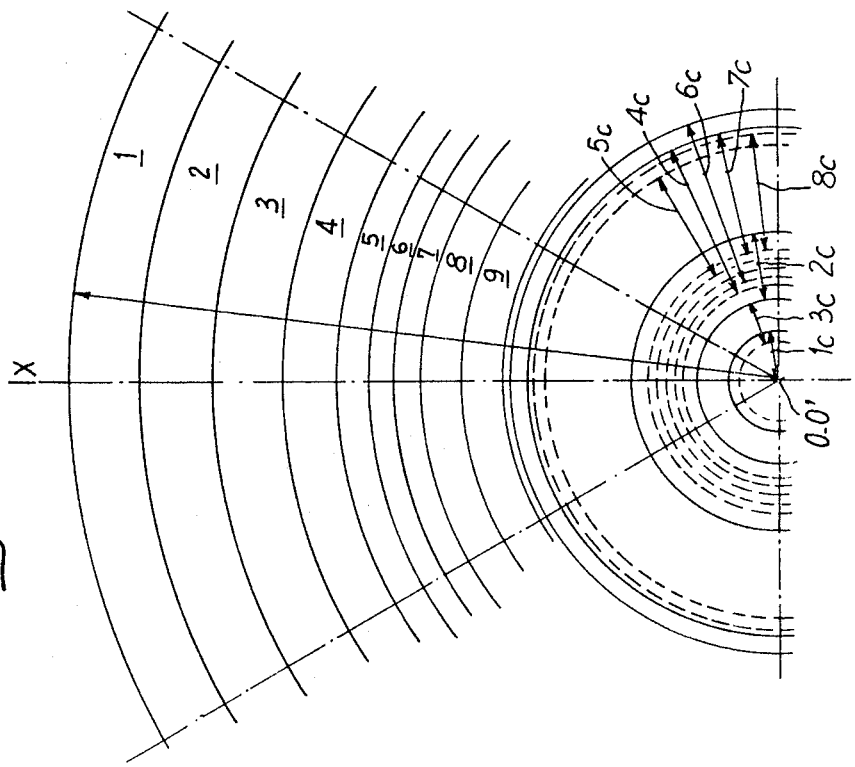
FIGS. 3 and 4 show, in plan, respectively the assembly of reflectors and back-reflectors of the apparatus of FIG. 1 and that of the apparatus of FIG. 2.
Figure 3:
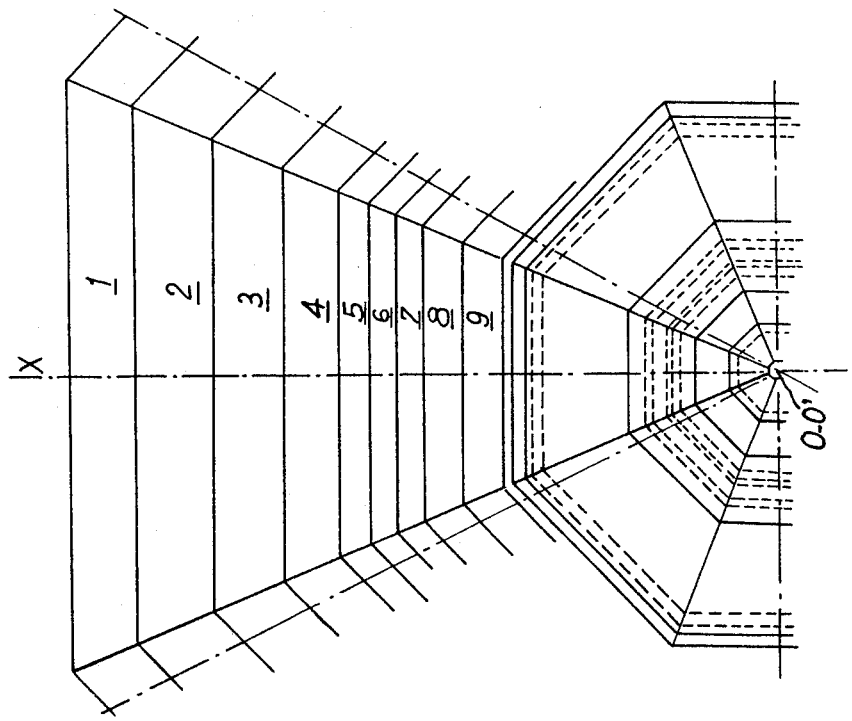

As is shown in FIGS. 1 and 3, the reflectors 1 to 9 and the back-reflectors 1c to 8c can have a truncated pyramidal shape and can be constituted from juxtaposed flat facets. In the embodiment shown in FIGS. 1 to 3, each reflector and back-reflector comprises eight facets but it is possible to adopt a different number, even or odd, according to the circumstances. As shown in FIGS. 2 and 4, the reflectors 1 to 9 and the back-reflectors 1c to 8c can also have a truncated conical shape.

Figure 6:
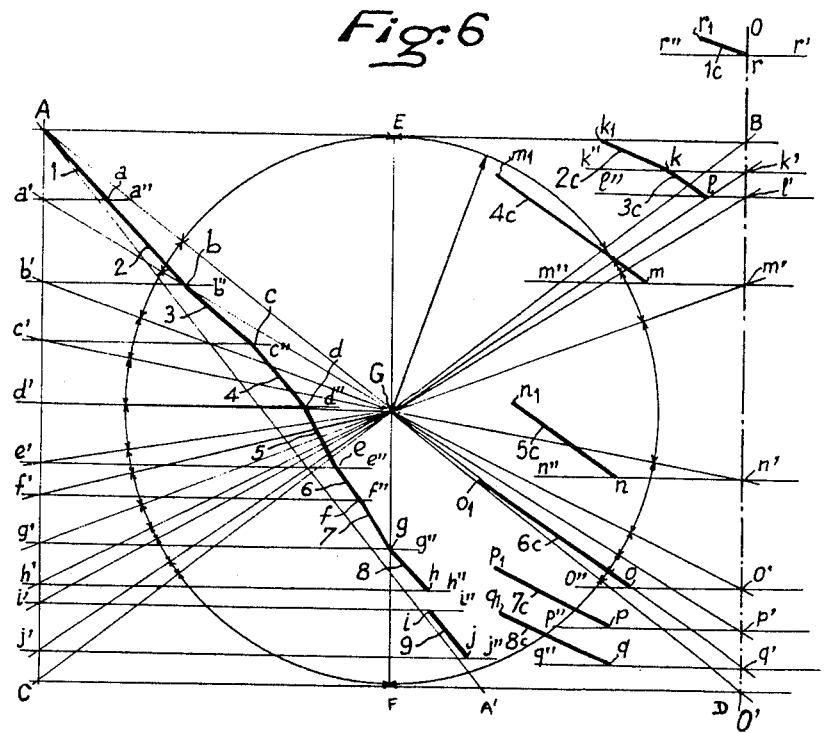

According to the invention, each of the reflectors 1 to 9 and back-reflectors 1c to 8c has a rectilinear aspect in section through any plane passing through axis O—O', as emerges notably from FIGS. 6 to 8 which correspond to the planes of section OX of FIGS. 3 and 4. In FIG. 3, the plane OX passes through the middle of the side of each facet of a series of polyhedral reflectors and back-reflectors. In FIG. 4, the plane OX has any orientation since the axis O—O' constitutes an axis of revolution for the assembly of reflectors and back-reflectors.

Moreover, the reflectors and back-reflectors are arranged so that the heat collecting means are positioned beyond their assembly, in the input direction of the incident solar rays. This is shown in particular by FIG. 5 where the incident rays arrive vertically, from above to below, and where the collecting means or collector 12 are situated lower than the last reflector 9 and the last back-reflector 8c.

In addition, the reflectors are grouped so as to form a practically continuous surface whose general appearance is that of a truncated pyramid (FIGS. 1 and 3) or a cone (FIGS. 2 and 4) but whose section through a plane OX passing through the axis O—O' is a broken line (see FIGS. 5 to 8).

Figure 5:
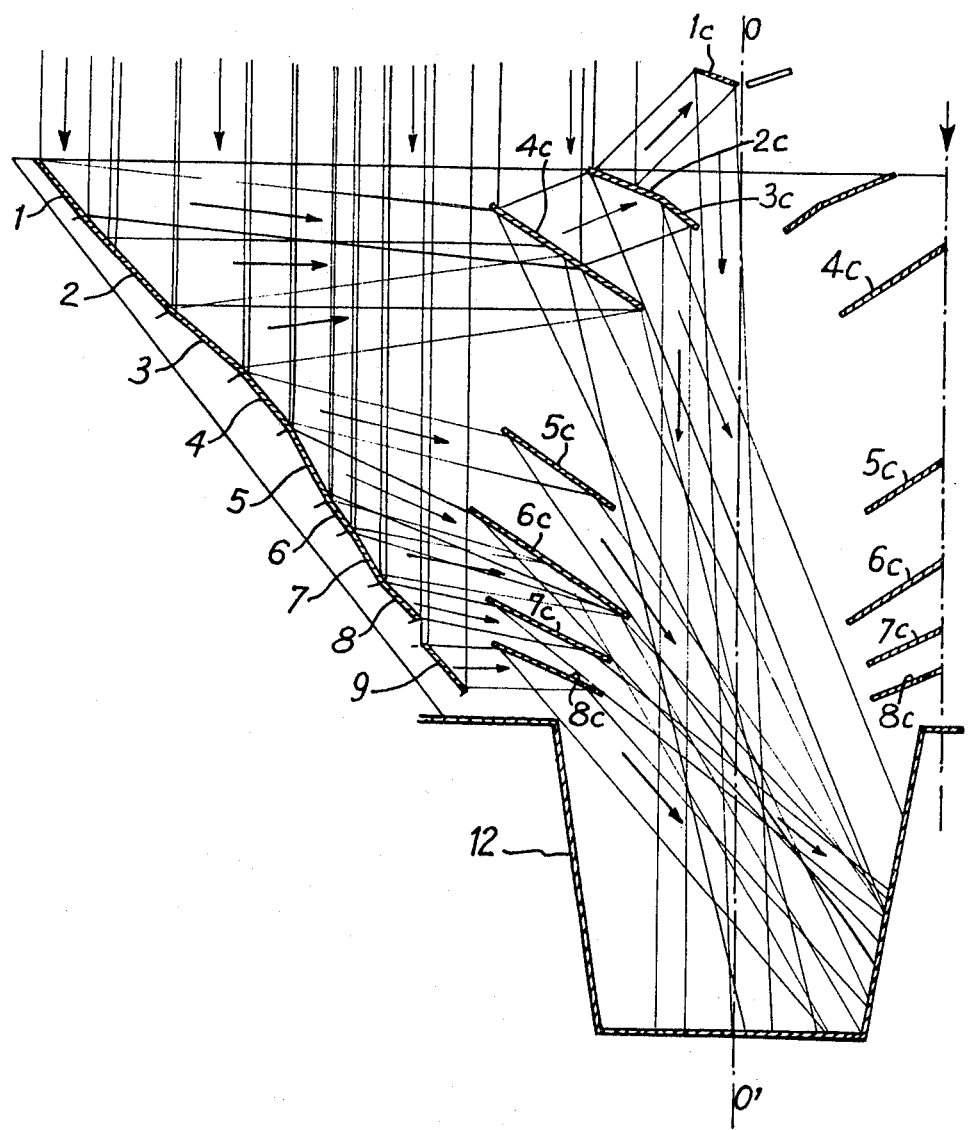
FIG. 5 shows, in section through a plane passing through the axis of the apparatus, the assembly of reflectors and back-reflectors, as well as the path of incident and reflected rays.

Lastly, the back-reflectors 1c to 8c are staggered axially and radially so that the solar rays reflected directly by the reflectors and reflected a second time by the back-reflectors can arrive at the collecting means or collector 12 without being intercepted by another reflector or back-reflector as shown in FIG. 5.

FIGS. 6 to 8 show the preferred embodiment of the invention and illustrate the method enabling the various reflectors and back-reflectors to be dimensioned and positioned.

One commences by drawing a rectangle ABCD of which one side BD coincides with the axis O—O' of the apparatus and of which the half diagonals BG and GD form an angle of 75° with one another, G being the centre of the rectangle ABDC.

Then, as regards the reflectors, inside th angle $\widehat{AGC}$, one traces succesively (see FIG. 6) angles whose values are indicated below and whose sides cut the small side AC of the rectangle at $a'$, $b'$, $c'$. . . . $j'$.

$\widehat{AGa'} = 6°45'$ $\widehat{a'Gb'} = 11°10'$ $\widehat{b'Gc'} = 8°50'$ $\widehat{c'Gd'} = 9°40'$ $\widehat{d'Ge'} = 9°40'$ $\widehat{e'Gf'} = 5°5'$ $\widehat{f'Gg'} = 7°25'$ $\widehat{g'Gh'} = 5°25'$ $\widehat{h'Gi'} = 2°35'$ $\widehat{i'Gj'} = 5°35'$ $\widehat{j'Gc} = 2°50'$.

From points $a'$, $b'$ . . . $j'$, parallels to the large sides AB or CD of the rectangle are then traced, these parallels being denoted by $a'a''$, $b'b''$ . . . $j'j''$ in FIG. 6. Lastly, on these parallels $a'a''$, $b'b''$... $j'j''$, one traces the angles whose values are indicated below, so that their sides non-parallel to the large sides AB or CD of the rectangle pass, for the first angle, through the point A; for the second angle, through the point $a$ constituting the apex of the preceding angle and so on up to point $h$.

$\widehat{Aaa'} = 47°20'$ $\widehat{abb'} = 45°30'$ $\widehat{bcc'} = 40°30'$ $\widehat{cdd'} = 51°35'$ $\widehat{dee'} = 55°40'$ $\widehat{eff'} = 53°$ $\widehat{fgg'} = 49°$ $\widehat{ghh'} = 50°30'$.

The point $i$ is the intersection of the line $i'i''$ with a perpendicular to this line brought from the point $h$. Lastly, one obtains the point $j$ at the intersection with $j'j''$ of a line passing through the point $i$ and making with $j'j''$ an angle of 47°15'.

One thus obtains an assembly of reflectors whose section through a plane passing through the axis O—O' is constituted by the broken line $Aa$ (reflector 1), $ab$ (reflector 2), $bc$ (reflector 3), $cd$ (reflector 4), $de$ (reflector 5), $ef$ (reflector 6), $fg$ (reflector 7) and $gh$ (reflector 8). The reflector 9, whose edges are defined by the points $i$ and $j$ is separated from the assembly of the preceding ones by the distance $hi$. It is observed that the reflectors 1 to 9 are grouped practically along a surface of a truncated cone or pyramid whose half angle a the apex, that is to say the angle formed by the lines AA' and O—O' in FIG. 6, is equal to 39°10'. In other words, the angle $\widehat{AA'C}$, which is the complement of the preceding one, is equal to 50°50'.

Another method for positioning the points $a, b, \ldots i$ and $j$ has been shown in FIG. 7. Let E be the middle of the side AB and I be the middle of the side AC.

From the point I taken as apex, one traces successively the angles whose values are indicated below:

$\widehat{AIa} = 14°20'$ $\widehat{aIb} = 33°45'$ $\widehat{bIc} = 24°10'$ $\widehat{cId} = 16°15'$.

In the same way, from the point C taken as apex, one traces successively the angles whose values are indicated below:

$\widehat{ACb} = 19°25'$ $\widehat{ibCc} = 12°25'$ $\widehat{cCd} = 11°5'$ $\widehat{dCe} = 11°25'$ $\widehat{eCf} = 6°15'$ $\widehat{fCg} = 9°10'$ $\widehat{gCh} = 6°50'$ $\widehat{hCi} = 2°40'$ $\widehat{iCj} = 7°30'$ $\widehat{jCD} = 3°15'$.

Lastly, from the point E taken as apex, one traces successively the angles whose values are indicated below:

$\widehat{AEa} = 11°15'$ $\widehat{aEb} = 23°$ $\widehat{bEc} = 20°45'$ $\widehat{cEd} = 15°20'$ $\widehat{dEe} = 10°10'$ $\widehat{eEf} = 4°45'$ $\widehat{fEg} = 5°20'$ $\widehat{gEh} = 4°45'$ $\widehat{hEj} = 4°15'$.

The point $a$ is at the intersection of the half-lines I$a$ and E$a$; the point $b$ at the intersection of the half-lines I$b$, C$b$ and E$b$; the point $c$ at the intersection of the half-lines I$c$, C$c$ and E$c$; the point $d$ at the intersection of the half-lines I$d$, C$d$ and E$d$; the point $e$ at the intersection of the half-lines C$e$ and E$e$; the point $f$ at the intersection of the half-lines C$f$ and E$f$; the point $g$ at the intersection of the half-lines C$g$ and E$g$; the point $h$ at the intersection of the half-lines C$h$ and E$h$; the point $i$ practically at the intersection of the half-lines C$i$ and E$h$; and finally the point $j$ at the intersection of the half-lines C$j$ and E$j$.

Similar methods enable the location of the back-reflectors 1c ... 8c. These methods are a little more delicate than for the reflectors considering that the back-reflectors are staggered both radially and axially.

Let us call $r, k, l, m, n, o, p$ and $q$ the lower edges of the back-reflectors 1c, 2c, ... 8c, respectively. The point $k$ also constitutes the upper edge of the back-reflector 3c. Let us call $r_1, k_1, m_1, n_1, o_1, p_1, q_1$ the upper edges of the back-reflectors 1c, 2c, 4c, 5c, 6c, 7c and 8c, respectively.

From the point J, the middle of the side BD, taken as apex, we trace the following angles (FIG. 8):

$\widehat{BJl} = 10°15'$ $\widehat{lJk} = 7°55'$ $\widehat{kJk_1} = 11°5'$ $\widehat{k_1Jm} = 6°50'$ $\widehat{mJm_1} = 11°30'$ $\widehat{m_1Jn_1} = 39°30'$ $$\widehat{n_1Jn} = 31°50'$$

$$\widehat{nJp_1} = 2°10'$$

$$\widehat{p_1Jq_1} = 6°50'$$

$$\widehat{q_1Jo} = 21°25'$$

$$\widehat{oJp} = 0°45'$$

$$\widehat{pJq} = 2°45'$$

$$\widehat{qJD} = 27°10'.$$

From the point B taken as apex, the angles traced are $$\widehat{OBr} = 1°$$

and $$\widehat{rBr_1} = 23°.$$

From the point E taken as apex, one traces, upwards, the angles $$\widehat{BEr} = 13°30'$$

and $$\widehat{rEr_1} = 4°40'$$

as well as, downwards, the angles $$\widehat{BEk} = 6°15'$$

$$\widehat{kEl} = 4°$$

$$\widehat{lEm_1} = 9°10'$$

$$\widehat{m_1Em} = 9°25'$$

$$\widehat{mEn} = 16°$$

$$\widehat{nEn_1} = 10°15'$$

$$\widehat{n_1Eo_1} = 10°25'$$

$$\widehat{o_1EF} = 14°30'.$$

From the point G taken as apex, one traces on the one hand the angles $$\widehat{FGq_1} = 28°25'$$

$$\widehat{q_1Gp_1} = 5°40'.$$

From the point F taken as apex, one traces the angles $$\widehat{GFn_1} = 23°10' = \widehat{GFo_1}$$

$$\widehat{n_1Fp_1} = 17°35'$$

$$\widehat{p_1Fo} = 28°25'$$

$$\widehat{oFp} = 7°35'$$

$$\widehat{pFq} = 8°25'$$

$$\widehat{qFD} = 4°40'.$$

The back-reflector 1c is defined by its edge r, the intersection of the half-lines Er and Br, and by its edge $r_1$, the intersection of $Br_1$ with $Er_1$.

The back-reflector 2c is defined by its edge k, the intersection of the half-lines Ek and Jk, and by its edge $k_1$, the intersection of the side AB with the half-line $JK_1$.

The back-reflector 3c is defined by its edge k, common with the back-reflector 2c, and by its edge l, the intersection of the half-lines El and Jl.

The back-reflector 4c is defined by its edge m, the intersection of the half-lines Em and Jm, and by its edge $m_1$, the intersection of the half-lines $Em_1$ and $Jm_1$.

The back-reflector 5c is defined by its edge n, the intersection of the half-lines En and Jn, and by its edge $n_1$, the intersection of the half-lines $En_1$ and $Fn_1$.

The back-reflector 6c is defined by its edge o, the intersection of the half-lines Fo and Jo, and by its edge $o_1$, the intersection of the half-lines $Eo_1$ and $Fo_1$.

The back-reflector 7c is defined by its edge p, the intersection of the half-lines Fp and Jp, and by its edge $p_1$, the intersection of the half-lines $Fp_1$ and $Jp_1$.

Lastly, the back-reflector 8c is defined by its edge q, the intersection of the half-lines Fq and Jq, and by its edge $q_1$, the intersection of the half-lines $Gq_1$ and $Jq_1$.

To avoid any error, two methods of checking are provided. The first relates to the ordinate (side parallel to the axis O—O') of the lower edges of the majority of the back-reflectors. From the point G taken as apex, one traces successively the angles whose values are indicated below and of which the sides cut the small side BD of the rectangle ABDC at k', l'. . p', q' (FIG. 6):

$$\widehat{BGk'} = 3°15'$$

$$\widehat{k'Gl'} = 3°5'$$

$$\widehat{l'Gm'} = 11°30'$$

$$\widehat{m'Gn'} = 30°5'$$

$$\widehat{n'Go'} = 15°35'$$

$$\widehat{o'Gp'} = 5°$$

$$\widehat{p'Gq'} = 4°$$

$$\widehat{q'GD} = 2°30'.$$

If one traces, through the points k', l'. . . p', q', parallels k"k', l"l', . . . p"p', q"q' to the side AB, these parallels must pass respectively through the lower edges k, l, . . . p, q of the back-reflectors 2c, 3c . . . 7c, 8c.

The second method of checking relates of the angles of inclination of the back-reflectors with respect to the parallels r'r", k'k", l'l". . . q'q".

These angles must be equal, respectively to

21°30' for the back-reflector 1c
22°40' for the back-reflector 2c
33°30' for the back-reflector 3c
33°40' for the back-reflector 4c
33°20' for the back-reflector 5c
33°20' for the back-reflector 6c
26°10' for the back-reflector 7c
24°35' for the back-reflector 8c.

An apparatus is thus obtained in which the solar rays are reflected in the manner indicated in FIG. 5.

The rays received by the reflectors 1,2 and 3 are reflected to the back-reflector 4c; the rays received by the reflector 4 are reflected to the back-reflector 5c; the rays received by the reflectors 5,6 and 7 are reflected to the back-reflector 6c; the rays received by the reflectors 8 and 9 are reflected respectively to the back-reflectors 7c and 8c.

The rays which are intercepted by the back of the back-reflector 4c are reflected by the latter to the back-reflectors 2c and 3c. Lastly, the major part of the rays intercepted by the back of the back-reflector 2c are reflected by the latter to the back-reflector 1c.

Finally, and except for a small central zone, all the rays are reflected by the back-reflectors, after only two reflections, to the collecting means 12. Since the later are located beyond the reflectors and back-reflectors in the direction of arrival of the incident rays, it is possible to give them optimal shape and volume without risk of impeding the propagation of the useful solar rays and thus reducing the energy efficiency of the installation.

The reflectors and back-reflectors are preferably constructed of steel sheet which has been subjected to surface treatment to give it the desired reflecting power.

What I claim is:

1. Apparatus for focusing by reflection and for using solar energy and comprising: outer reflectors and inner back-reflectors arranged according to an invariable geometry and distributed symmetrically with respect to an axis;

means adapted to maintain said axis directed towards the sun during daylight hours;

and heat-collecting means situated along said axis at a position such that said means receive the solar rays reflected by said reflectors and back-reflectors, each of said reflectors and back-reflectors having a rectilinear appearance in section through any plane passing through said axis and being arranged so that said heat-collecting means are placed beyond the arrangement of said reflectors and back-reflectors, in the direction of arrival of the incident solar rays;

said reflectors being grouped so as to form a practically continuous surface whose general appearance is that of a truncated cone or pyramid but whose section through said plane is a broken line whilst the back-reflectors are staggered axially and radially so that solar rays reflected directly by said reflectors and reflected a second time by said back-reflectors arrive at the heat-collecting means without being intercepted by another of said reflectors and back-reflectors.

2. Apparatus according to claim 1, wherein each of said reflectors and back-reflectors has a shape similar to that of a truncated cone.

3. Apparatus according to claim 1, wherein each of said reflectors and back-reflectors has a shape similar to that of a truncated pyramid.

4. Apparatus according to claim 1, wherein at least one of said back-reflectors situated in the vicinity of an input plane of the whole of said reflectors has two opposite surfaces and acts not only on one of said surfaces as a back-reflector for the solar rays already reflected directly by reflectors, but again by its other said surface as reflector to reflect directly the solar rays close to said axis to another back-reflector still closer to said axis.

5. Apparatus according to claim 2, wherein the truncated conical surface along which said reflectors are grouped has a half-angle at the apex of the order of 40°.

6. Apparatus according to claim 2, wherein the section of each said reflector through a plane passing through said forms with this axis an angle comprised between 35° and 50°.

7. Apparatus according to claim 3, wherein the truncated pyramidal surface along which said reflectors are grouped has a half-angle at the apex of the order of 40°.

8. Apparatus according to claim 3, wherein the section of each said reflector through a plane passing through said axis forms with the axis an angle comprised between 35° and 50°.

* * * * *